United States Patent [19]
Daoud

[11] Patent Number: 6,071,126
[45] Date of Patent: Jun. 6, 2000

[54] SURGE PROTECTOR PANEL FOR USE IN A BUILDING ENTRANCE PROTECTOR

[75] Inventor: Bassel Hage Daoud, Parsippany, N.J.

[73] Assignee: Lucent Technologies Inc., Murray Hill, N.J.

[21] Appl. No.: 09/050,329

[22] Filed: Mar. 30, 1998

[51] Int. Cl.[7] ........................... H01R 29/00; H02R 1/056
[52] U.S. Cl. ............................................... 439/49; 439/54
[58] Field of Search ............................. 439/49, 54, 709, 439/922; 361/800

[56] References Cited

U.S. PATENT DOCUMENTS

| | | | |
|---|---|---|---|
| 4,213,013 | 7/1980 | Perna et al. | 179/98 |
| 4,782,427 | 11/1988 | Marks | 361/426 |
| 5,457,593 | 10/1995 | James Glasser | 361/119 |
| 5,706,160 | 1/1998 | Latuszkin et al. | 361/119 |

*Primary Examiner*—Steven L. Stephan
*Assistant Examiner*—Chandrika Prasad
*Attorney, Agent, or Firm*—Gibbons, Del Deo, Dolan, Griffinger & Vecchione

[57] ABSTRACT

An assembly for use in a building entrance protector. The assembly includes a circuit board and surge protector modules. A surge protector panel is mounted to the circuit board, wherein the surge protector panel is adapted to receive the surge protector modules. A first connector port and a second connector port are both coupled to the circuit board. Electrical pathways extend between the first connector port and the second connector port that extend through the surge protector modules on the surge protector panel. Outside plant wiring entering the building entrance protector is electrically interconnected with the assembly via a first connector that engages the first connector port. Similarly, customer premises wiring that enters the building entrance protector is electrically interconnected the assembly via a second connector that engages the second connector port. Since connectors join wiring elements to the assembly, the assembly can be easily removed from the building entrance protector by disconnecting the connectors and isolating the assembly.

18 Claims, 3 Drawing Sheets

SURGE PROTECTOR PANEL FOR USE IN A BUILDING ENTRANCE PROTECTOR

RELATED APPLICATIONS

This application is related to the following:

U.S. patent application Ser. No. 09/050,525, entitled BUILDING PROTECTOR WITH REPLACEABLE FUSIBLE LINK ASSEMBLY,(DAOUD-33) filed Mar. 30, 1998, which is herein incorporated into this disclosure by reference.

BACKGROUND OF THE INVENTION

1. Field of the Invention

The present invention relates to building entrance protectors for telecommunication lines. More particularly, the present invention relates to the surge protection panel contained within the building entrance protector and how different components interconnect to the surge protection panel.

2. Description of the Prior Art

Building entrance protector (BEP) is the name used in the art of telephone equipment to describe the junction box where telephone lines from outside plant wiring are joined to customer premises equipment. In the most common application, the BEP is the place where the telephone lines from a telephone pole, for example, enter a building and are joined to the telephone system within that building. Within the BEP there is an input wire termination device that receives the telephone lines contained within the outside plant wiring. Also contained within the BEP is an output wire termination device that receives the telephone lines required for the customer premises equipment. Located in between the input wire termination device and the output wire termination device are fusible links. The fusible links are typically 26 gauge copper wire, which is thinner than the gauge of either the outside plant wiring or the customer premises equipment. The surge protector panel is a panel designed to receive surge protector modules. The surge protector modules eliminate power spikes that pass into the BEP that are capable of harming equipment on the consumer side of the BEP.

In addition to the surge protector modules, fusible links are also present within the BEP. The fusible links are typically 26 gauge copper wire, which is thinner than the gauge of either the outside plant wiring or the customer premises equipment.

The purpose of the fusible links is to prevent power surges from passing through the BEP that can damage equipment located within the building or melt any wire on the customer side of the BEP. Since telephone lines are typically strung on the same poles as power lines, a break in a power line that subsequently contacts a telephone line, can result in a large surge of power passing through the telephone lines into a building. Similarly, lightning strikes can result large surges of power pass in through telephone lines into a building. The purpose of the BEP is to ensure that any such power surge is stopped at the point of the BEP and is prevented from traveling into the building where it can cause damage to equipment and possibly a fire.

Referring to FIG. 1, a typical prior art BEP 10 is shown. From FIG. 1, it can be seen that as the outside plant wiring 12 passes into the BEP 10, the outside plant wiring 12 passes into a sealed, fire-resistant splice chamber 14. Within the splice chamber 14, some of the telephone wires contained within the outside plant wiring 16 are joined to fusible links 16, via an input wire termination device 18. Each set of the fusible links 16 leads to a different surge protector port 20 on a surge protector panel 22. Removable surge protector modules 25 are received into the surge protector panel 22. The different surge protector ports 20 are coupled to an output wire termination device 24. The customer premises equipment connects to the output wire termination device 24 within the BEP 10.

The fusible links 16 can connect to the outside plant wiring 12 and the surge protector panel 22 in a number of different ways. Commonly, an input wire termination device 18 such as a terminal array connector 28 is used to engage the fusible links. In the shown embodiment, a model S 66 M connector manufactured by Siemens Company is illustrated by way of example.

Referring to FIG. 2, it can be seen that the fusible links 16 are connected to the terminal leads 26 on the bottom of the terminal array connector 28 and the outside plant wiring 12 is connected to the terminal leads 30 on the top of the terminal array connector 28. The fusible links 16 extend through a narrow hole 32 in the wall of the splice chamber 14 and connect to terminals 34 on the bottom of the surge protector panel 22. Similarly, the output wire termination device 24 is also commonly hard wired to the surge protector panel 22. As such, the cross-connection between the input wire termination device 18 and the output wire termination device 24 is dependent upon where the outside plant wires 12 (FIG. 1) are connected to the input wire termination device 18.

Since the surge protector panel 22 is wired to both the input wire termination device 18 and the output wire termination device 24, it is not cost effective to replace the surge protector panel should it ever need repairs or rewiring. Consequently, the entire BEP 10 is often replaced if the surge protector panel 22 or its related wiring is defective.

A need therefore exists for a BEP where the surge protector panel can be more readily removed for repairs or rewiring if needed. A need also exists for a BEP where changes in cross wiring can be more easily facilitated.

SUMMARY OF THE INVENTION

The present invention is an assembly for use in a building entrance protector. The assembly includes a circuit board and surge protector modules. A surge protector panel is mounted to the circuit board, wherein the surge protector panel is adapted to receive the surge protector modules. A first connector port and a second connector port are both coupled to the circuit board. Electrical pathways extend between the first connector port and the second connector port that extend through the surge protector modules on the surge protector panel.

Outside plant wiring entering the building entrance protector is electrically interconnected with the assembly via a first connector that engages the first connector port. Similarly, customer premises wiring that enters the building entrance protector is electrically interconnected to the assembly via a second connector that engages the second connector port. Since connectors join wiring elements to the assembly, the assembly can be easily removed from the building entrance protector by disconnecting the connectors and isolating the assembly.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
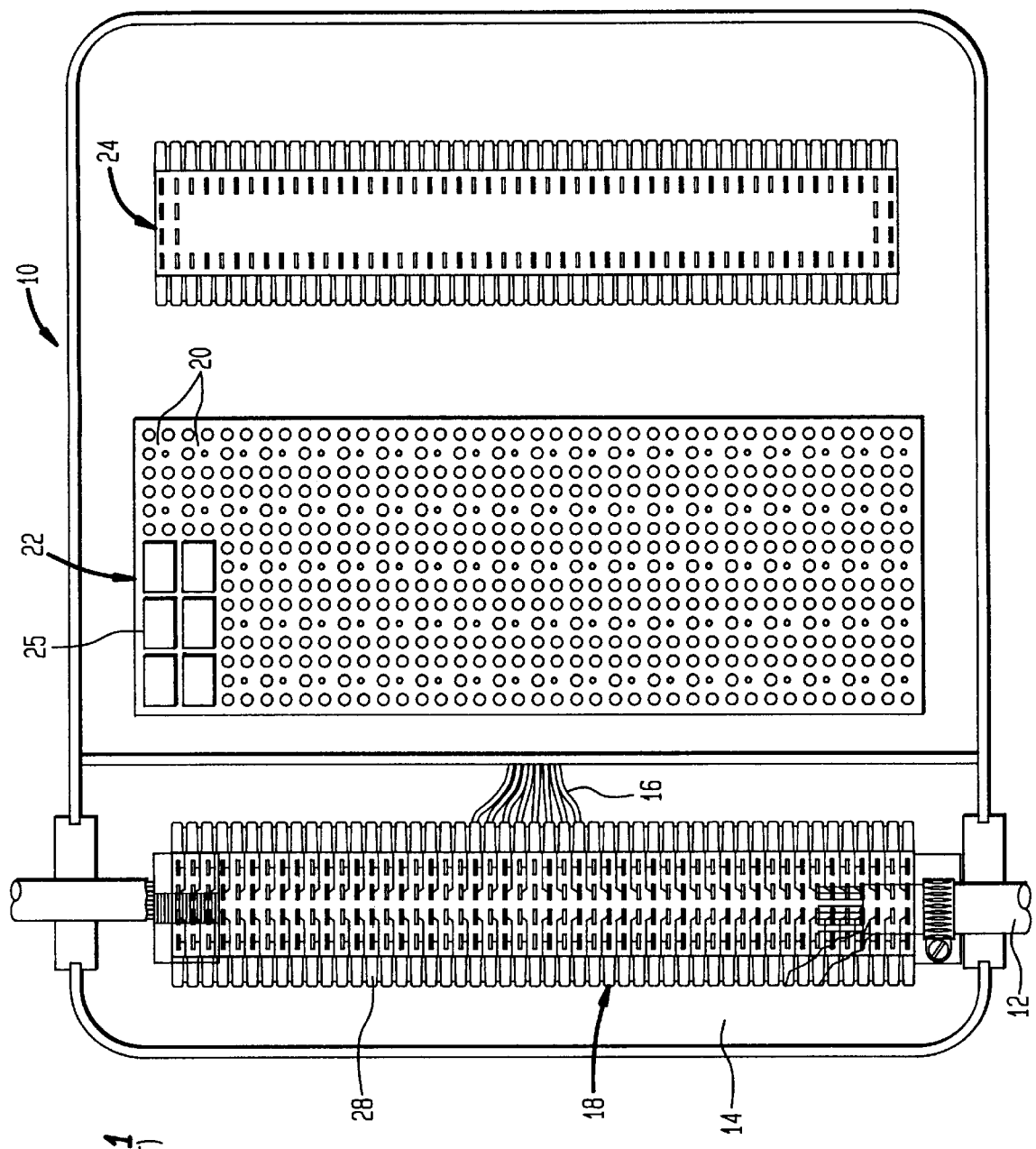
FIG. 1 is a front view of a prior art building entrance protector.
Figure 2:
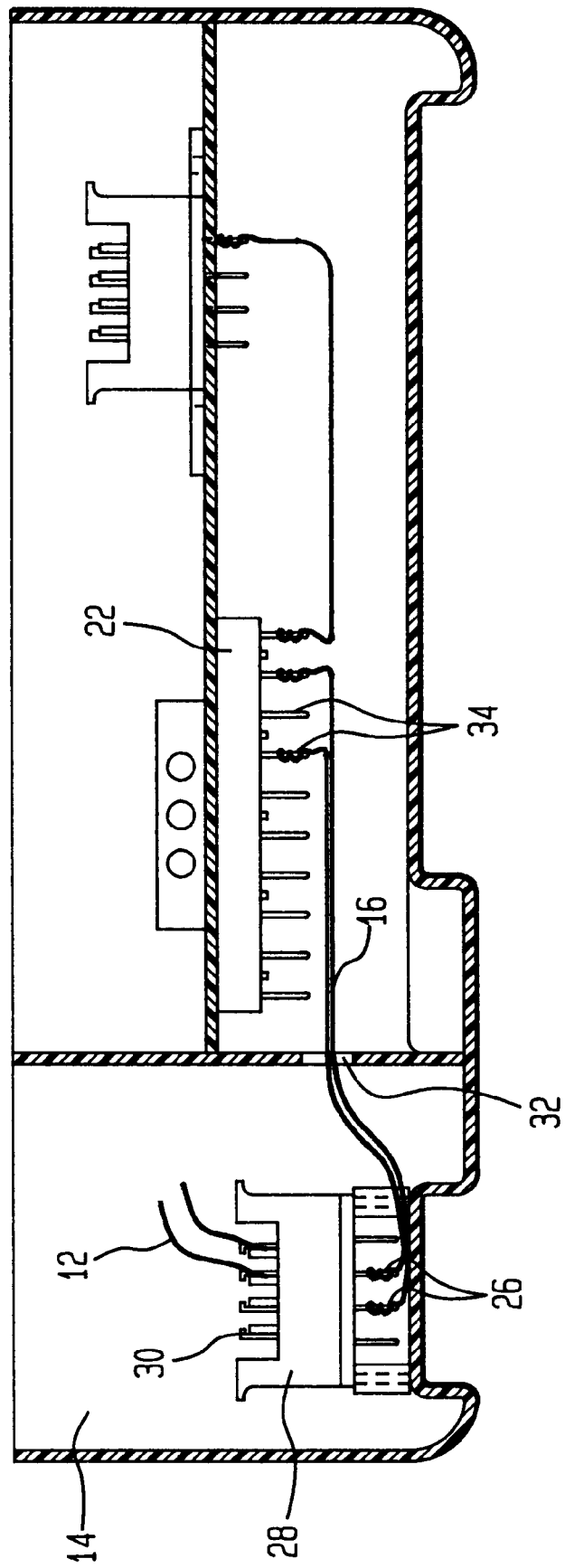
FIG. 2 is a cross-sectional view of the prior art building entrance protector shown in FIG. 1.

The present invention improves upon the prior art BEP shown in both FIG. 1 and FIG. 2 and shares many features with that prior art design. For the sake of clarity, elements of the present invention that are the same as the prior art will be referenced using the same reference numerals that were used in describing the prior art.

Figure 3:
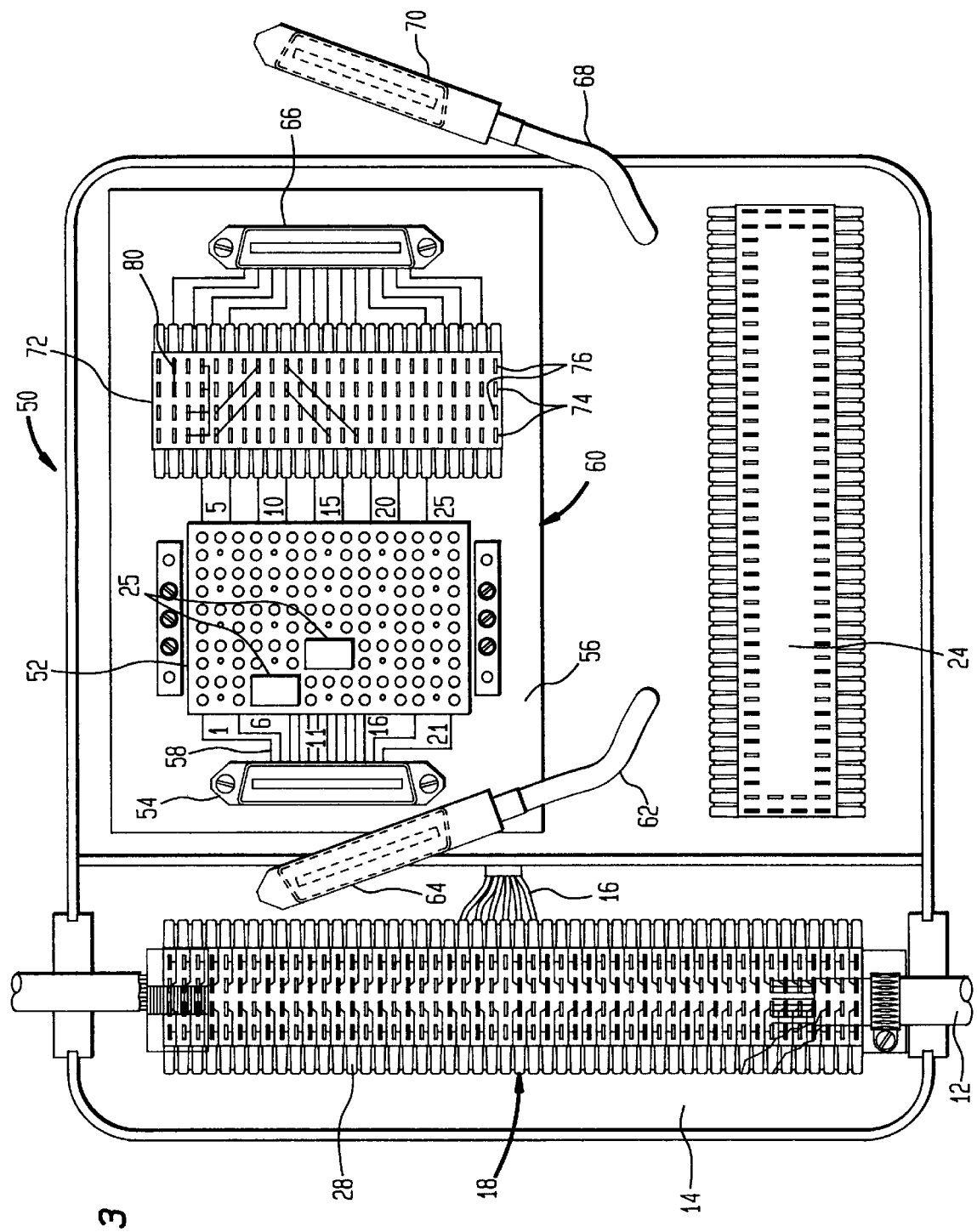
FIG. 3 is front view of an exemplary building entrance protector in accordance with the present invention.

Referring to FIG. 3, a BEP 50 in accordance with the present invention is shown. In this BEP 50, the surge protector panel 52 is provided that accepts surge protector modules 25 in the same manner as in the prior art. The surge protector panel is not connected directly to any of the fusible links 16. Rather, the surge protector panel 52 is coupled to a pin connector port 54. The pin connector port 54 is preferably affixed to the same mounting surface 56 as is the surge protector panel 52. The pin connector port 54 is positioned so that it is accessible from the same point of access as is the surge protector panel 52.

The pin connector port 54 can be any type of either male or female connector. In the shown embodiment, a fifty pin female connector is used by way of example. The pin connector port 54 is coupled to the underside of the surge protector panel 52 by either wires, not shown, or circuit pathways 58 on a printed circuit board 60, as is shown. In either case, the current capacity of either the wires used or the circuit pathways 58 used should be greater than that of the fusible links 16.

The fusible links 16 used in the BEP 50 are contained within a disposable cable assembly 62. The structure of the fusible link cable assembly 62 is described in related U.S. patent application Ser. No. 09/050,525, entitled Building Entrance Protector With Replaceable Fusible Link Assembly, which is assigned to Lucent Technologies, the assignee herein and which is incorporated into this disclosure by reference.

At one end of the cable assembly 62, each of the fusible links 16 terminates with a pin connector 64. The pin connector 64 is sized and shaped to engage the connector port 54 disposed on the mounting surface 56 next to the surge protector panel 52. The opposite ends of the fusible links 16 in the cable assembly 62 can be left unterminated. In this manner, the free ends of the fusible links 16 can be selectively coupled to the bottom terminals of a terminal array connector 28 in a traditional manner. Alternatively, the second end of the fusible links 16 in the cable assembly 62 can be coupled to any connector commonly used in the splice chamber of a BEP.

In the shown embodiment, the surge protector panel 52 is mounted on a circuit board 60. The input pin connector port 54 that engages the fusible link cable assembly 62 is also mounted to that circuit board 60. The input pin connector port 54 is interconnected with the surge protector panel 52 by circuit pathways 58 that are printed on the circuit board 60. It will therefore be understood that the circuit board 60 can be disconnected from the fusible link cable 62 by simply removing the pin connector 64 of the cable assembly 62 from the input connector port 54 on the circuit board 60. Once disconnected, the surge protector panel 60 is no longer connected to the fusible links 16 or the outside plant wiring 12 from which they extend.

An output connector port 66 is also affixed to the circuit board 56. The output connector port 66 is electrically interconnected with the surge protector panel 52, via circuit pathways that are printed on the circuit board 60. The output connector port 66 can be any type of either male or female connector. In the shown embodiment, a fifty pin male connector is used by way of example.

Wires from the customer premises wiring can be directly terminated with a connector that engages the output connector port 66 on the circuit board. However, in the preferred embodiment, a conventional output wire termination device 24 is used. A second cable assembly 68 extends from the output wire termination device 24. The second cable assembly 68 terminates with a connector 70 that can engage the output connector port 66 on the circuit board 60. It will therefore be understood that the circuit board 60 can be disconnected from the output wire termination device 24 by simply removing the pin connector 70 of the second cable assembly 68 from the output connector 66 on the circuit board 60. Once disconnected, the surge protector panel 52 is no longer connected to the output wire termination device 24 or the customer premises wiring extending to that device.

Since the surge protector circuit board 60 can be easily disconnected from both the input wire termination device 18 and the output wire termination device 24 within the BEP 50, it should be understood that the surge protector circuit board 60 can readily removed from the BEP 50 without excessive labor. Accordingly, should the surge protector panel 52 or its associated wiring ever need to be repaired or altered, the entire surge protector circuit board 60 can be rapidly removed and repaired or replaced as needed.

In FIG. 3, an optional cross-connect terminal array 72 is also shown. The cross-connect terminal array 72 is interposed between the surge protector panel 52 and the output connector port 66. The cross-connect terminal array 72 is mounted on the circuit board 60. The cross-connect terminal array 72 contains a first set of terminals 74 and a second set of terminals 76. The first set of terminals 74 is coupled to the surge protector panel 52 via circuit pathways printed on the circuit board 60. Similarly, the second set of terminals 76 is coupled to the output connector port 66 via circuit pathways printed on the circuit board 60. To interconnect circuit pathways leading from the output connector port 66 to pathways leading from the surge protector panel 52, cross connection elements 80 are used. The cross connect elements 80 can be wires or conductive clips that span from the first set of terminals 74 to the second set of terminals 76.

By selectively interconnecting different terminals from the first set of terminals 74 to terminals on the second set of terminals 76, different interconnection pathways can be had. Accordingly, different wires in from the outside plant wiring 12 can be selectively connected to different wires from the customer premises wiring by only altering the cross connection elements 80 on the cross-connect array 72. This allows wiring pathways to be altered without having to alter any of the circuit pathways or hard wiring that may exist within the BEP 50.

It will be understood that the embodiments of the present invention specifically shown and described are merely exemplary and that a person skilled in the art can make alternate embodiments using different configurations and functionally equivalent components. For example, the types of connectors used on the printed circuit board can be altered as desired. Furthermore, the number of surge protector ports and cross-connect terminals can be varied. All such alternate embodiments are intended to be included in the scope of this invention as set forth in the following claims.

What is claimed is:

1. An assembly for use in a building entrance protector, said assembly comprising:

an input termination device for receiving external wires;

a plurality of fusible links, each having a first end and a second end, wherein said first end of each of said fusible links is coupled to said input termination device and said second end of each of said fusible links terminates at a common connector;

a circuit board;

a surge protector panel mounted to said circuit board, wherein said surge protector panel is adapted to receive surge protector modules;

a first connector port coupled to said circuit board, wherein said first connector port is configured to receive said common connector; and a second connector port coupled to said circuit board, wherein electrical pathways exist between said first connector port and said second connector port that extend through said surge protector panel.

2. The assembly according to claim 1, wherein said first connector port and said second connector port are coupled to said surge protector panel by circuit pathways printed on said circuit board.

3. The assembly according to claim 1, further including a cross-connect array disposed between said first connector port and said second connector port.

4. The assembly according to claim 3, wherein said cross-connect array includes a first plurality of terminals electrically coupled to said surge protector panel and a second plurality of arrays electrically coupled to said second connector port.

5. The assembly according to claim 4, further including cross connection elements for selectively interconnecting at least one of said first plurality of terminals to at least one of said second plurality of terminals.

6. A building entrance protector assembly for interconnecting outside plant wiring to consumer premises wiring, said building entrance protector comprising:

an input termination device for receiving wires contained within the outside plant wiring;

an output termination device for receiving wires contained within the consumer premises wiring;

a surge protector assembly having a first connector port and a second connector port;

a plurality of fusible links, each having a first end and a second end, wherein said first end of each of said fusible links is coupled to said input termination device and said second end of each of said fusible links terminatea at a common first connector, wherein said first connector is received by said first connector port and interconnects said input termination device to said surge protector; and a cable assembly having a second connector adapted to selectively engage said second connector port, wherein said cable assembly interconnects said output termination device to said surge protector.

7. The assembly according to claim 6, wherein said surge protector assembly includes a surge proctor panel, wherein said surge protector panel, said first connector port and said second connector port are mounted on a common circuit board.

8. The assembly according to claim 7, wherein said surge protector panel, said first connector port and said second connector port are interconnected by circuit pathways printed on said circuit board.

9. The assembly according to claim 7, further including a cross connection array disposed between said input wire termination device and said output wire termination device for selectively connecting different wires that are coupled to said input wire termination device and said output wire termination device.

10. The assembly according to claim 9, wherein said cross connection array is mounted on said circuit board.

11. The assembly according to claim 9, wherein said cross-connect array includes a first plurality of terminals electrically coupled to said surge protector panel and a second plurality of arrays electrically coupled to said second connector port.

12. The assembly according to claim 11, further including cross connection elements for selectively interconnecting at least one of said first plurality of terminals to at least one of said second plurality of terminals.

13. A method of connecting an input wire termination device to an output wire termination device in a building entrance protector assembly, said method comprising the steps of:

providing a surge protector assembly having a first connector port and a second connector port;

connecting a plurality of fusible links between said first connector port and said input wire termination device, wherein said plurality of fusible links terminates at a common first connector that can be selectively disconnected from said first connector port; and connecting a cable between said second connector port and said output wire termination device, wherein said cable terminates in a second connector that can be selectively disconnected from said second connector.

14. The method according to claim 13, wherein said surge protector assembly includes a surge protector panel, wherein said surge protector panel, said first connector port and said second connector port are mounted on a common circuit board.

15. The method according to claim 14, wherein said surge protector panel, said first connector port and said second connector port are interconnected by circuit pathways printed on said circuit board.

16. The method according to claim 14, further including a cross connection array disposed between said input wire termination device and said output wire termination device for selectively connecting different wires that are coupled to said input wire termination device and said output wire termination device.

17. The method according to claim 16, wherein said cross connection array is mounted on said circuit board.

18. The assembly according to claim 16, wherein said cross-connect array includes a first plurality of terminals electrically coupled to said surge protector panel and a second plurality of arrays electrically coupled to said second connector port.

* * * * *